United States Patent
McCune

(10) Patent No.: US 9,263,967 B2
(45) Date of Patent: Feb. 16, 2016

(54) AC/DC POWER CONVERSION METHODS AND APPARATUS

(76) Inventor: Earl W. McCune, Santa Clara, CA (US)

( * ) Notice: Subject to any disclaimer, the term of this patent is extended or adjusted under 35 U.S.C. 154(b) by 1027 days.

(21) Appl. No.: 12/841,608

(22) Filed: Jul. 22, 2010

(65) Prior Publication Data
US 2012/0020135 A1     Jan. 26, 2012

(51) Int. Cl.
H02M 7/217 (2006.01)
H02M 7/04 (2006.01)
G05F 1/24 (2006.01)

(52) U.S. Cl.
CPC .................... *H02M 7/2176* (2013.01)

(58) Field of Classification Search
CPC ............ Y02B 70/126; H02M 1/4208; H02M 1/4225; H02M 3/1582; H02M 3/158
USPC ................. 363/89, 81–82, 84, 125, 127–128; 323/259, 271, 351
See application file for complete search history.

(56) References Cited

U.S. PATENT DOCUMENTS

| | | | |
|---|---|---|---|
| 4,502,104 A * | 2/1985 | Mitchell | 363/26 |
| 5,206,801 A * | 4/1993 | Flick et al. | 363/53 |
| 5,208,740 A | 5/1993 | Ehsani | |
| 5,291,385 A * | 3/1994 | Vinciarelli | 363/20 |
| 5,570,279 A | 10/1996 | Venkataramanan | |
| 6,115,267 A | 9/2000 | Herbert | |
| 6,137,280 A | 10/2000 | Ackermann et al. | |
| 6,232,752 B1 | 5/2001 | Bissell | |
| 6,344,985 B1 | 2/2002 | Akerson | |
| 6,483,730 B2 * | 11/2002 | Johnson, Jr. | 363/123 |
| 6,577,517 B2 * | 6/2003 | Jain et al. | 363/89 |
| 6,580,258 B2 | 6/2003 | Wilcox et al. | |
| 6,650,095 B2 | 11/2003 | Aiello et al. | |
| 6,700,808 B2 | 3/2004 | MacDonald et al. | |
| 6,870,327 B2 | 3/2005 | Takahashi et al. | |
| 6,870,355 B2 * | 3/2005 | Iwahori | 323/351 |
| 7,139,180 B1 | 11/2006 | Herbert | |
| 7,202,640 B2 * | 4/2007 | Morita | 323/205 |
| 7,564,706 B1 | 7/2009 | Herbert | |
| 7,633,782 B1 * | 12/2009 | Herbert | 363/125 |
| 7,663,898 B2 | 2/2010 | Lindemann et al. | |
| 7,723,926 B2 | 5/2010 | Mednik et al. | |
| 7,729,134 B2 * | 6/2010 | Kimura | 363/20 |
| 2002/0181262 A1 * | 12/2002 | Wade | 363/125 |
| 2003/0035260 A1 | 2/2003 | Shearon et al. | |
| 2004/0080965 A1 * | 4/2004 | Poon et al. | 363/125 |
| 2007/0013349 A1 | 1/2007 | Bassett | |

(Continued)

OTHER PUBLICATIONS

J. Turchi, ON Semiconductor Application Note AND8392/D, "A 800 W Bridgeless PFC Stage," Feb. 2009.

(Continued)

*Primary Examiner* — Adolf Berhane
*Assistant Examiner* — Henry Lee, III
(74) *Attorney, Agent, or Firm* — William E. Winters; Patent Law Professionals, P.C.

(57) ABSTRACT

An AC/DC converter that converts an AC input voltage Vin to a DC output voltage comprises an inductor, a capacitor selectively coupled to the inductor, a plurality of switches, and a controller. The controller configures the plurality of switches, inductor, and capacitor to operate as a buck converter during times when Vin>Vout and to operate as an inverting buck converter during times when Vin<−Vout. The controller modulates the duty cycles of the plurality of switches to regulate the DC output voltage Vout to the desired, constant output level.

24 Claims, 10 Drawing Sheets

(56) References Cited

U.S. PATENT DOCUMENTS

| | | | |
|---|---|---|---|
| 2007/0182347 | A1 | 8/2007 | Shteynberg et al. |
| 2008/0031014 | A1 | 2/2008 | Young |
| 2008/0055952 | A1 | 3/2008 | Chisenga et al. |
| 2009/0303762 | A1* | 12/2009 | Jang et al. ............. 363/61 |
| 2010/0014329 | A1* | 1/2010 | Zhang et al. ............ 363/89 |
| 2010/0045255 | A1 | 2/2010 | Chojecki et al. |
| 2010/0052628 | A1 | 3/2010 | Khayat et al. |
| 2010/0123403 | A1 | 5/2010 | Reed |

OTHER PUBLICATIONS

U. Moriconi, ST Microelectronics Application Note AN1606, "A 'Bridgeless P.F.C. Configuration' Based on L4981 P.F.C. Controller," Nov. 2002.

B. Lu, "Bridgeless PFC Implementation Using One Cycle Control Technique," Twentieth Annual IEEE Applied Power Electronics Conference and Exposition (APEC), pp. 812-817, vol. 2, 2005.

Y. Jang et al., "A Bridgeless PFC Boost Rectifier with Optimized Magnetic Utilization," IEEE Transactions on Power Electronics, vol. 24, No. 1, Jan. 2009.

L. Zuechao, Texas Instruments Application Report SLUA517, "UCC 28070 Implement Bridgeless Power Factor Correction (PFC) Pre-Regulator Design," Jul. 2009.

PCT/US2011/044572 International Search Report (PCT/ISA/210), Nov. 2011 (from related PCT application).

E. McCune, "Power Conversion and Control Systems and Methods for Solid-State Lighting," U.S. Appl. No. 12/897,066, filed Oct. 4, 2010.

E. McCune, "Power Conversion and Control Systems and Methods for Solid-State Lighting," U.S. Appl. No. 12/897,094, filed Oct. 4, 2010.

E. McCune, "Power Conversion and Control Systems and Methods for Solid-State Lighting," U.S. Appl. No. 12/897,081, filed Oct. 4, 2010.

A. Gobbi, "Understanding Power Factor and Input Current Harmonics in Switched Mode Power Supplies," White Paper: TW0062, Feb. 2009.

Jun. 21, 2012 Office Action from related U.S. Appl. No. 12/897,066, including Notice of References.

Aug. 14, 2012 Office Action from related U.S. Appl. No. 12/897,081, including Notice of References.

Aug. 14, 2012 Office Action from related U.S. Appl. No. 12/897,094, including Notice of References.

Zywyn Corporation, Universal TransformerFree AC-DC Constant LED Driver, Sunnyvale, California, Jun. 2010 (URL: http://www.zywyn.com/pdf/led/ZD832_ds.pdf) (cited in PCT/US2011/054478).

Mar. 27, 2013 Office Action from related U.S. Appl. No. 13/734,903, including Notice of References.

Apr. 9, 2013 Office Action from related U.S. Appl. No. 12/897,094, including Notice of References.

PCT/US2011/054478 International Search Report and Written Opinion.

Jul. 2, 2013 Office Action from U.S. Appl. No. 12/897,066.

Huber et al., "Performance Evaluation of Bridgeless PFC Boost Rectifiers," IEEE Transactions on Power Electronics, vol. 2, No. 3, pp. 1381-1390, May 2008.

Aug. 18, 2014 Office Action from U.S. Appl. No. 13/859,869.

Zywyn Corporation New Release, "Zywyn Announces Universal Transformerless AC-DC Constant Current LED Driver," Sunnyvale, California, Dec. 8, 2006 (retrieved from the Internet (URL: http://zywyn.com/pdf/PressReleases/pressReleaseZD831.pdf)).

* cited by examiner

| Switch | Vin > Vout | Vin < -Vout | \|Vin\| < Vout |
|--------|------------|-------------|----------------|
| 602 | D | OFF | OFF |
| 604 | 1-D | ON | OFF |
| 606 | OFF | D | OFF |
| 608 | ON | 1-D | OFF |

US 9,263,967 B2

AC/DC POWER CONVERSION METHODS AND APPARATUS

FIELD OF THE INVENTION

The present invention relates in general to power conversion and in particular to methods and apparatus for converting alternating current (AC) to direct current (DC).

BACKGROUND OF THE INVENTION

Many household and industrial machines and devices are powered by a direct current (DC) power source that has been rectified from alternating current (AC) power provided by the AC mains. The AC-to-DC rectification is typically accomplished using a bridge rectifier 104 (or "diode bridge") comprised of four diodes 102-1, 102-2, 102-3 102-4 configured as shown in FIG. 1. The bridge rectifier 104 converts the positive and negative half cycles of the AC input voltage Vin to a full-wave-rectified waveform of constant polarity. (See FIGS. 2A and 2B). To produce the desired steady DC output voltage Vout across a load 108, the rectified waveform is filtered by a smoothing circuit, which in its simplest form comprises a smoothing capacitor 106 coupled to the output of the bridge rectifier 104. The smoothing capacitor 106 functions to maintain the DC output voltage Vout near the peak voltage Vpeak during the low portions of the AC input voltage Vin, as shown in FIG. 2C. Some amount of AC ripple is superimposed on the DC output Vout, even following filtering by the smoothing capacitor 106. The ripple may or may not be tolerable, depending on the application. In applications where it is not tolerable, additional filtering can be employed to reduce it to an acceptable level.

The AC/DC converter 100 in FIG. 1 generates a DC output voltage Vout near the peak voltage Vpeak of the AC input voltage Vin (see FIG. 2C). However, many applications require a much lower voltage. For example, many machines and devices require a DC voltage of 12 volts DC or less but the peak voltage Vpeak of the center-tapped 120 volts RMS (root mean square) residential mains is near 170 V. To lower the DC voltage to the required level, a step-down transformer or DC-DC converter 302 (i.e., "buck converter") is used. FIG. 3 illustrates use of a DC-DC converter 302. The DC-DC converter 302 comprises a switch (typically a metal-oxide-semiconductor field effect transistor (MOSFET)) 304, a diode (or, alternatively, a second MOSFET) 306, an inductor 308, a filter capacitor 310, and a pulse-width modulator (PWM) control 312. The PWM control 312 controls the opening and closing of the switch 304 at a fixed frequency f that is much higher than the 60 Hz line frequency (typically greater than 1 kHz). When the switch 304 is turned on, current flows through it, the inductor 308, and then into the filter capacitor 310 and the load 108. The increasing current causes the magnetic field of the inductor 308 to build up and energy to be stored in the inductor's magnetic field. When the switch 304 is turned off, the voltage drop across the inductor 308 quickly reverses polarity and the energy stored by the inductor 308 is used as a current source for the load 108. The DC output voltage Vout is determined by the proportion of time the switch 304 is on ($t_{ON}$) in each period T, where T=1/f More specifically, Vout=DVin(dc), where D=$t_{ON}$/T is known as the "duty cycle" and Vin(dc) is the source DC input voltage provided at the output of the bridge rectifier 104. The PWM control 312 is configured in a feed back path, allowing it to regulate the DC output voltage Vout by modulating the duty cycle D.

Although the AC/DC converter 300 in FIG. 3 addresses the inability of the AC/DC converter 100 in FIG. 1 to step down the DC voltage to a lower DC voltage, it does not address another well-known problem of conventional AC/DC converters—low power factor. The power factor of an AC/DC converter is a dimensionless number between 0 and 1 indicating how effectively real power from an AC power source is transferred to a load. An AC/DC converter with a low power factor draws more current from the mains than one having a high power factor for the same amount of useful power transferred. A low power factor can result due to the input voltage Vin being out of phase with the input current Iin or by action of a nonlinear load distorting the shape of the input current Iin. The latter situation arises in non-power-factor-corrected AC/DC converters, such as those described in FIGS. 1 and 3, which as described above use a diode bridge 104. The filter capacitor 106 of the AC/DC converter 100 in FIG. 1 (and, similarly, the filter capacitor 310 of the AC/DC converter 300 in FIG. 3) remains charged near the peak voltage Vpeak for most of the time. This means that the instantaneous AC line voltage Vin is below the filter capacitor 106 voltage for most of the time. The diodes 102-1, 102-2, 102-3 102-4 of the bridge rectifier 104 therefore conduct only for a small portion of each AC half-cycle, resulting in the input current Iin drawn from the mains being a series of narrow pulses, as illustrated in FIG. 4. Note that although the input current Iin is in phase with the AC input voltage Vin, it is distorted and, therefore, rich in harmonics of the line frequency. The harmonics lower the power factor, resulting in reduced conversion efficiency and undesirable heating in the AC mains generator and distribution systems. The harmonics also create noise that can interfere with the performance of other electronic equipment.

To reduce harmonics and increase the power factor, conventional AC/DC converters are often equipped with a power factor correction (PFC) pre-regulator. The PFC pre-regulator can be formed in various ways. One approach employs a PFC boost converter 502 coupled between the bridge rectifier 104 and the DC-DC converter 302, as shown in the power-factor-corrected AC/DC converter 500 in FIG. 5. The PFC boost converter 502 comprises an inductor 504, switch 506, diode 508, output capacitor 510 and a PFC control 512. The PFC control 512 controls the on and off state of the switch 506. When the switch 506 is switched on, current from the mains flows through the inductor 504, causing energy to build up and be stored in the inductor's magnetic field. During this time, current to the DC-DC converter 302 and load 108 is supplied by the charge in the capacitor 510. When the switch 506 is turned off, the voltage across the inductor 504 quickly reverses polarity to oppose any drop in current, and current flows through the inductor 504, the diode 508 and to the DC-DC converter 302, recharging the capacitor 510 as well. With the polarity reversed, the voltage across the inductor 504 adds to the source input DC voltage, thereby boosting the input DC voltage. The PFC boost converter 502 output voltage is dependent on the duty cycle D of the on-off switch control signal provided by the PFC control circuit 512. More specifically, the PFC boost converter 502 output voltage is proportional to 1/(1-D), where D is the duty cycle and (1-D) is the proportion of the switching cycle T (i.e., commutation period) that switch 506 is off. In addition to setting the duty cycle D, the PFC control 512 forces the DC-DC converter 302 and load 108 to draw current that on average follows the sinusoidal shape of the AC input voltage Vin, thereby reducing harmonics and increasing the power factor of the AC/DC converter 500.

The power-factor-corrected AC/DC converter 500 is suitable for many applications. However, it has a number of drawbacks. First, the AC/DC converter is less efficient than desired, particularly since the AC-to-DC power conversion requires two stages—the PFC boost converter 502 front end and the DC-DC converter 302 final stage. Second, the converter 500 has a large parts count, including parts necessary to implement the two control circuits (PFC control 512 and PWM control 312), which increases design complexity and cost, and makes the converter 500 more susceptible to failure. Third, the PFC boost converter 502 generates very high voltages, which stress the converter's parts and raise safety concerns.

It would be desirable, therefore, to have AC/DC conversion methods and apparatus that are efficient at converting AC to DC, avoid power factor degradation attributable to using a bridge rectifier, do not require voltage boosters to counteract power factor degradation, and do not have a large parts count.

SUMMARY OF THE INVENTION

Methods and apparatus for converting alternating current (AC) to direct current (DC) are disclosed. An exemplary AC/DC converter that converts an AC input voltage Vin, such as may be provided by the AC mains, to a DC output voltage comprises an inductor, a capacitor, a plurality of switches, and a controller. The controller configures the plurality of switches, inductor, and capacitor to operate as a buck converter during times when Vin>Vout and to operate as an inverting buck converter during times when Vin<−Vout. The controller modulates the duty cycles of the plurality of switches to regulate the DC output voltage Vout to the desired, constant output level.

The AC/DC converter of the present invention converts the AC input voltage Vin to the DC output voltage Vout directly, i.e., without the need for a bridge rectifier or transformer to complete the AC-to-DC conversion. Direct AC to DC conversion avoids power factor degradation problems attributable to use of bridge rectifiers, obviates the need for specialized power factor correction pre-regulator circuitry, and results in a low parts count and an energy-efficient design.

Further features and advantages of the invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
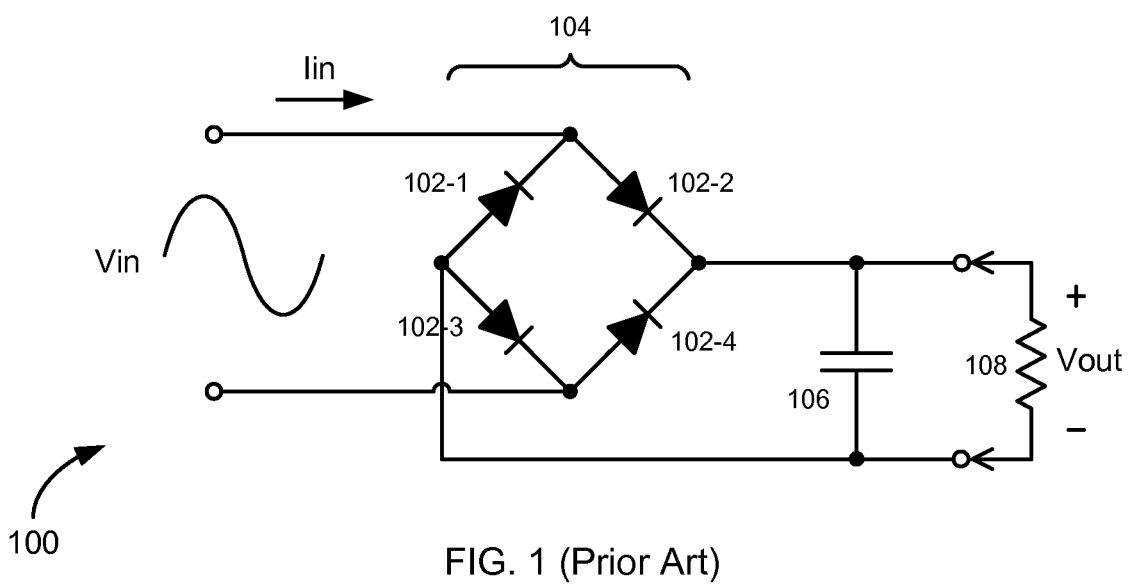
FIG. 1 is a circuit diagram of a conventional alternating current to direct current (AC/DC) converter.
Figure 2A:
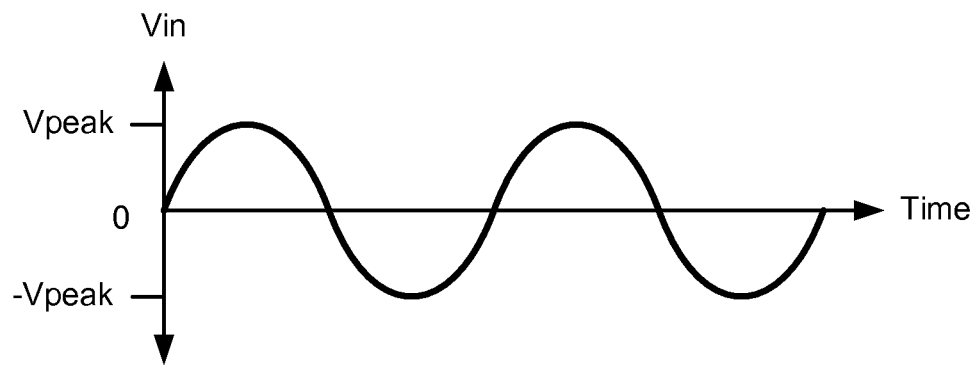
FIG. 2A is a signal diagram of the AC input voltage Vin applied to the AC input of the AC/DC converter in FIG. 1.
Figure 2B:
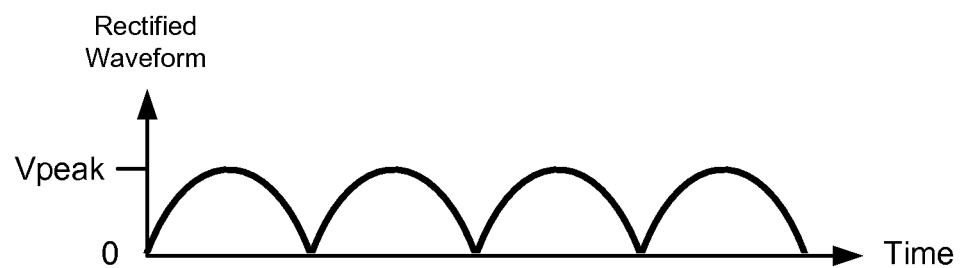
FIG. 2B is a signal diagram of the unfiltered, full-wave-rectified voltage waveform produced at the output of the bridge rectifier of the AC/DC converter in FIG. 1.
Figure 2C:
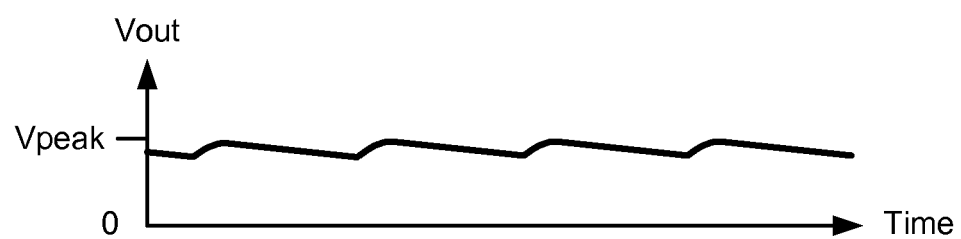
FIG. 2C is a signal diagram of the DC output voltage of the AC/DC converter in FIG. 1 after having been filtered by a smoothing capacitor.
Figure 3:
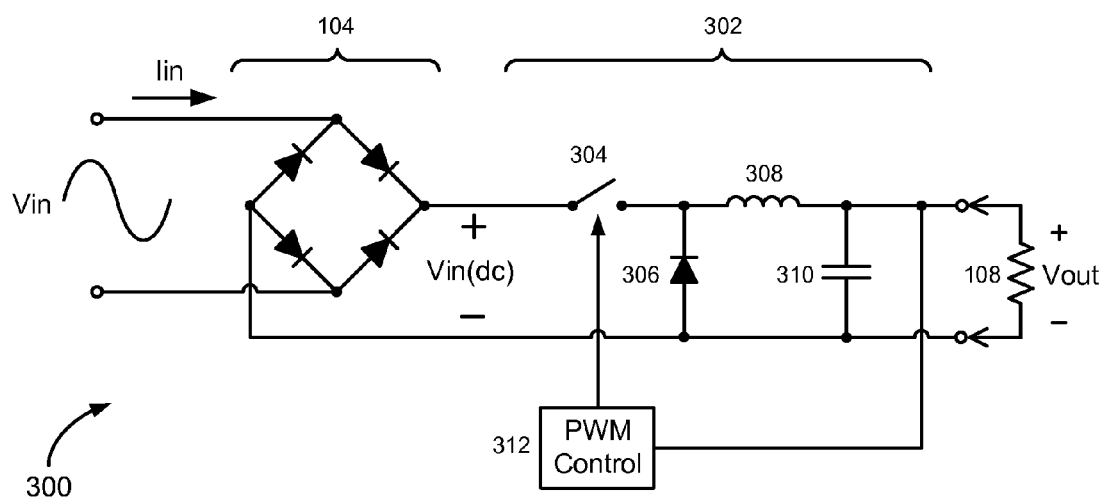
FIG. 3 is a circuit diagram of an AC/DC converter equipped with a step-down buck converter to step down the DC output voltage to a level lower than possible using just a bridge rectifier and smoothing capacitor.
Figure 4:
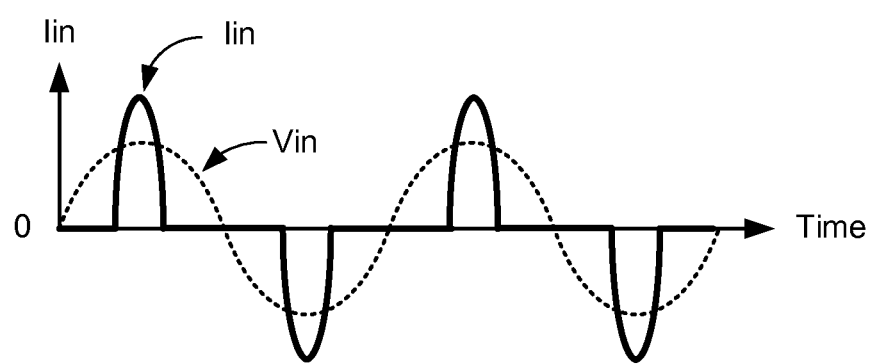
FIG. 4 is a signal diagram illustrating how the bridge rectifier used by the AC/DC converters in FIGS. 1 and 3 causes current to be drawn from the AC power source in narrow pulses that are rich in harmonics.
Figure 5:
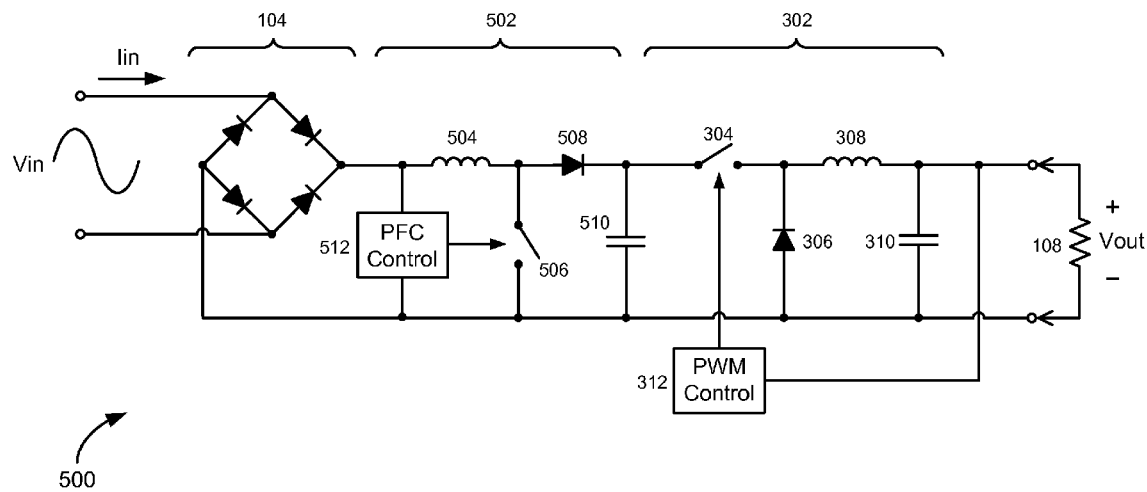
FIG. 5 is a circuit diagram of an AC/DC converter having a step-down buck converter and a power-factor-correcting boost converter that compensates for power factor degradation caused by the AC/DC converter's bridge rectifier.
Figure 6:
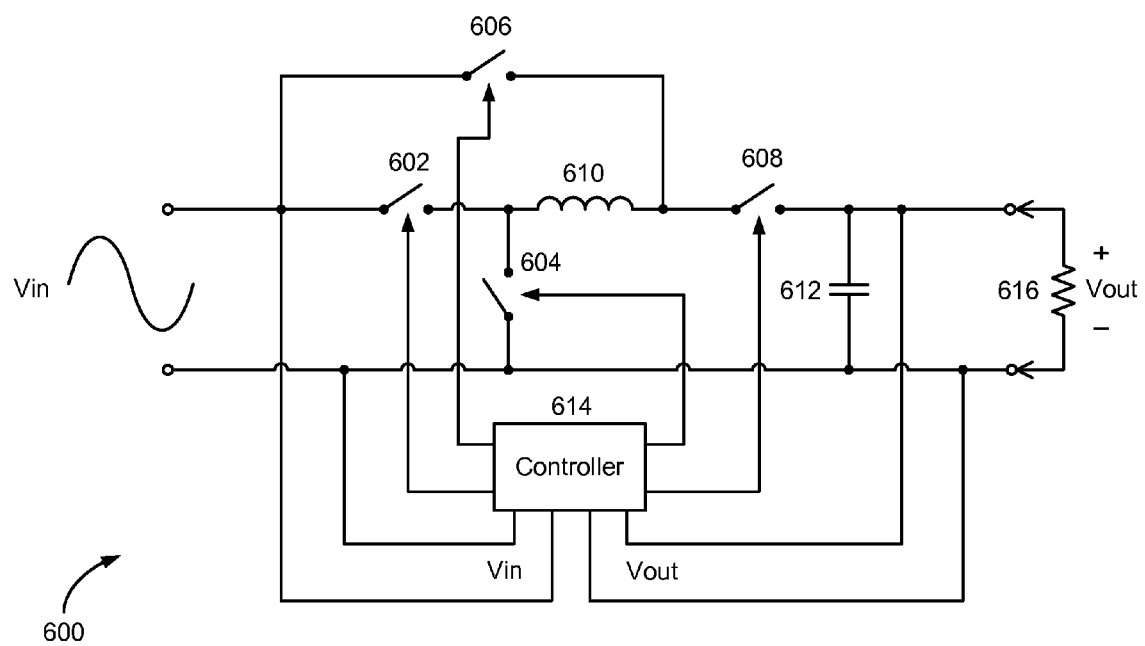
FIG. 6 is a circuit diagram of an AC/DC converter, according to an embodiment of the present invention.

Referring to FIG. 6, there is shown an alternating current to direct current (AC/DC) converter 600, according to an embodiment of the present invention. The AC/DC converter 600 comprises first, second, third and fourth switches 602, 604, 606 and 608, an inductor 610, a smoothing capacitor 612, and a controller 614. The first switch 602 is coupled between one terminal of the AC input and a first terminal of the inductor 610; the second switch 604 is coupled between the first terminal of the inductor 610 and the opposing-polarity terminal of the AC input; the third switch 606 is coupled between the AC input and the second terminal of the inductor 610; and the fourth switch 608 is coupled between the second terminal of the inductor 610 and the positive DC output terminal. The controller 614 generates switch drive signals for controlling the switching of the first, second, third and fourth switches 602, 604, 606 and 608, depending on the instantaneous AC input voltage Vin compared to the DC output voltage, and selectively modulates the duty cycles of the first, second, third and fourth switches 602, 604, 606 and 608 switches so that the DC output voltage Vout is maintained at the desired level, as is explained in more detail below.

The components of the AC/DC converter 600 comprise discrete devices, one or more integrated circuit (IC) chips, or a combination of discrete devices and IC chips. In one embodiment, the controller 614 and first, second, third, and fourth switches 602, 604, 606 and 608 are integrated in a single IC chip manufactured in accordance with a standard complementary metal-oxide-semiconductor (CMOS) fabrication process, with the first, second, third, and fourth switches 602, 604, 606 and 608 comprising metal-oxide-semiconductor field-effect transistors (MOSFETs). In another embodiment, the first, second, third, and fourth switches 602, 604, 606 and 608 are formed in a first IC chip and the controller is formed in a second IC chip. Whereas the first, second, third, and fourth switches 602, 604, 606 and 608 comprise silicon-based MOSFETs in the exemplary embodiment just described, other types of switching devices may be used, including conventional switches, diodes, relays, or other semiconductor-based or non-semiconductor-based switching devices. For example, in applications requiring fast switching speeds, compound-semiconductor-based transistor devices, such as high electron mobility transistors (HEMTs) or heterojunction bipolar transistors (HBTs), may be used to implement the first, second, third, and fourth switches 602, 604, 606 and 608 switches, instead of silicon-based MOSFETs. For the purpose of this disclosure, the term "switch" is used in its broadest sense to include all of these types of switches and any other suitable switching device. The inductor 610 and capacitor 612 may also be integrated in the one or more IC chips, or either or both of these devices may be discrete devices coupled to external pins of the one or more IC chips.

The AC/DC converter 600 is configured to directly convert an AC input voltage Vin, such as may be provided by the AC mains, to a DC output voltage Vout, without the need for a diode bridge or a step-down transformer. Direct conversion is accomplished by controlling and modulating the on/off states of the first, second, third, and fourth switches 602, 604, 606 and 608 using the controller 614. More specifically, depending on the instantaneous AC input voltage Vin compared to the DC output voltage Vout, the switches are turned on (closed), turned off (opened), driven by a switch drive signal of duty cycle D, or driven by a complementary switch drive signal of duty cycle (1-D). The switch drive signal (labeled "D" in FIG. 6) and the complementary switch drive signal (labeled "1-D" in FIG. 6) are periodic (or semi-periodic) and have a common, fixed switching frequency f=1/T, where T is the switching period. As illustrated in the signal diagram in FIG. 7 and shown in the switching table in FIG. 8, when Vin>Vout, the first switch 602 is driven by the switch drive signal at a duty cycle $t_{ON}/T=D$, the second switch 604 is driven by the complementary switch drive signal at a duty cycle $(T-t_{ON})/T=(1-D)$, the third switch 606 is turned off, and the fourth switch 608 is turned on. When Vin<-Vout, the first switch 602 is turned off, the second switch 604 is turned on, the third switch 606 is driven by the switch drive signal at a duty cycle D, and the fourth switch is driven by the complementary switch drive signal at a duty cycle (1-D). Finally, when Vin is greater than -Vout but less than Vout, i.e. when |Vin|<Vout, the first, second, third, and fourth switches 602, 604, 606 and 608 are turned off.

The DC output voltage of the AC/DC converter 600 is equal to D|Vin|, where |Vin| is the absolute value of the instantaneous AC input voltage. According to one embodiment, the controller 614 modulates the duty cycle D, regulating the DC output voltage Vout so that it is maintained at a constant level. The duty cycle D may also be managed to improve the power factor of the AC/DC converter 600. Whereas D is modulated to maintain the DC output voltage Vout at a constant level in the exemplary embodiment described here, in general Vout, D, and Vin are all variables. Accordingly, Vout need not necessarily be maintained at a constant level.

Figure 9:
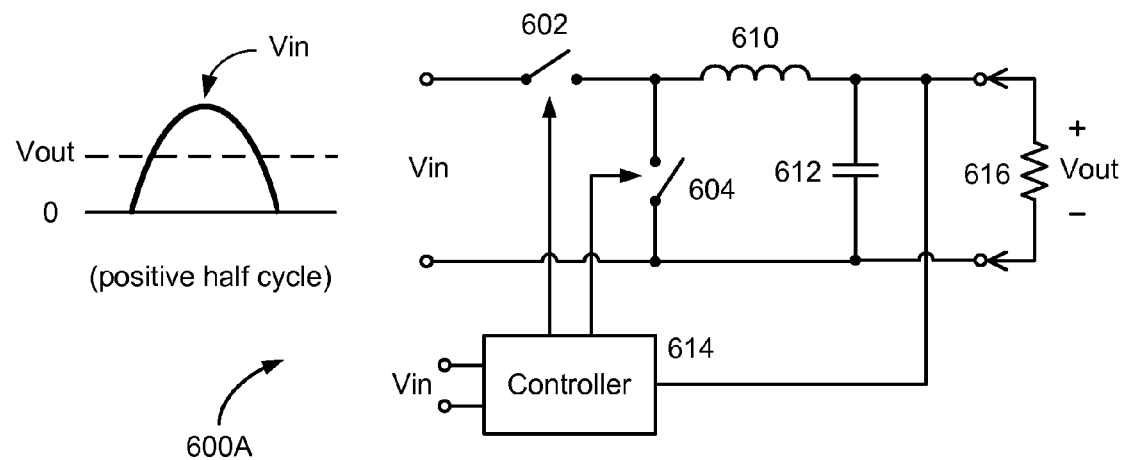
FIG. 9 is a circuit diagram illustrating how the AC/DC converter in FIG. 6 reduces to and operates as a buck converter during times of positive half cycles of the AC input voltage when Vin>Vout.

That Vout=D|Vin| is more readily apparent by understanding that the AC/DC converter 600 comprises an integrated (i.e., conjoined) buck converter and an inverting buck converter. During the positive half cycles of the AC input waveform when Vin>Vout, the third switch 606 is off, the fourth switch 608 is on, and the AC/DC converter 600 reduces to and operates as a buck converter 600A, as illustrated in FIG. 9. The first and second switches 602 and 604 serve as the high-side and low-side switches of the buck converter and are driven by the switch drive signal at duty cycle D and complementary switch drive signal at a duty cycle (1-D), respectively. The first and second switches 602 and 604 therefore alternately configure the inductor 610 between storing energy and supplying current during positive half cycles of the AC input voltage when Vin>Vout, and the DC output voltage Vout=DVin.

Figure 10:
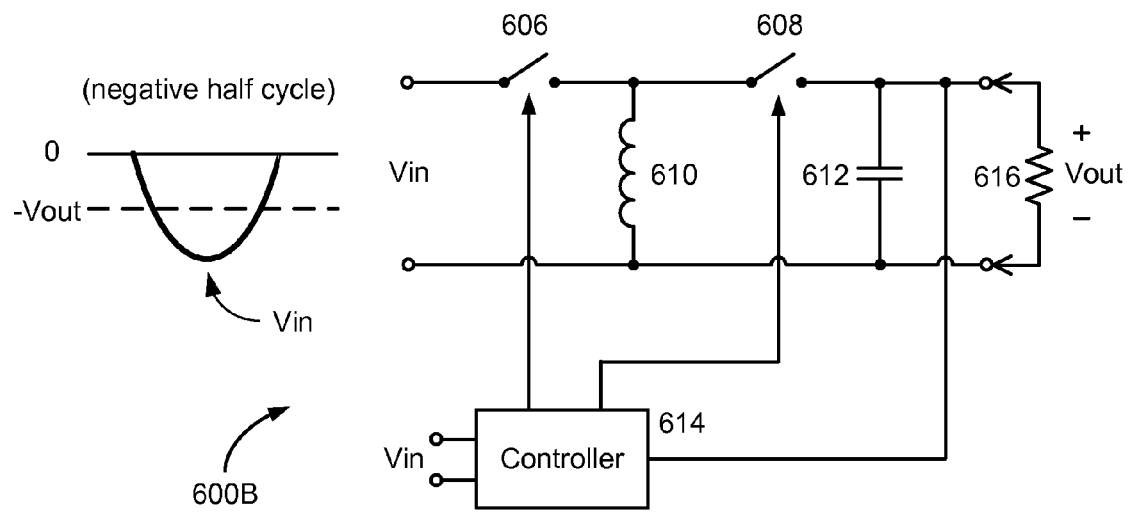
FIG. 10 is a circuit diagram illustrating how the AC/DC converter in FIG. 6 reduces to and operates as an inverting buck converter during times of negative half cycles of the AC input voltage when Vin<−Vout.

During the negative half cycles of the AC input waveform when Vin<-Vout, the first switch 602 is off, the second switch 604 is on, and the AC/DC converter 600 reduces to and operates as what may be referred to as an "inverting" buck converter 600B, as illustrated in FIG. 10. The third and fourth switches 606 and 608 are driven by the switch drive signal D and complementary switch drive signal (1-D), respectively. The inverting buck converter 600B inverts the negative input voltage Vin, alternately configuring, by the switching action of the third and fourth switches 606 and 608, the inductor 610 between storing energy and supplying current during the negative half cycles of the AC input voltage when Vin<-Vout, to produce an output voltage Vout equal to D|Vin|. Hence, considering both positive and negative half cycles, the AC/DC converter 600 produces a DC output voltage Vout=D|Vin|.

Figure 11:
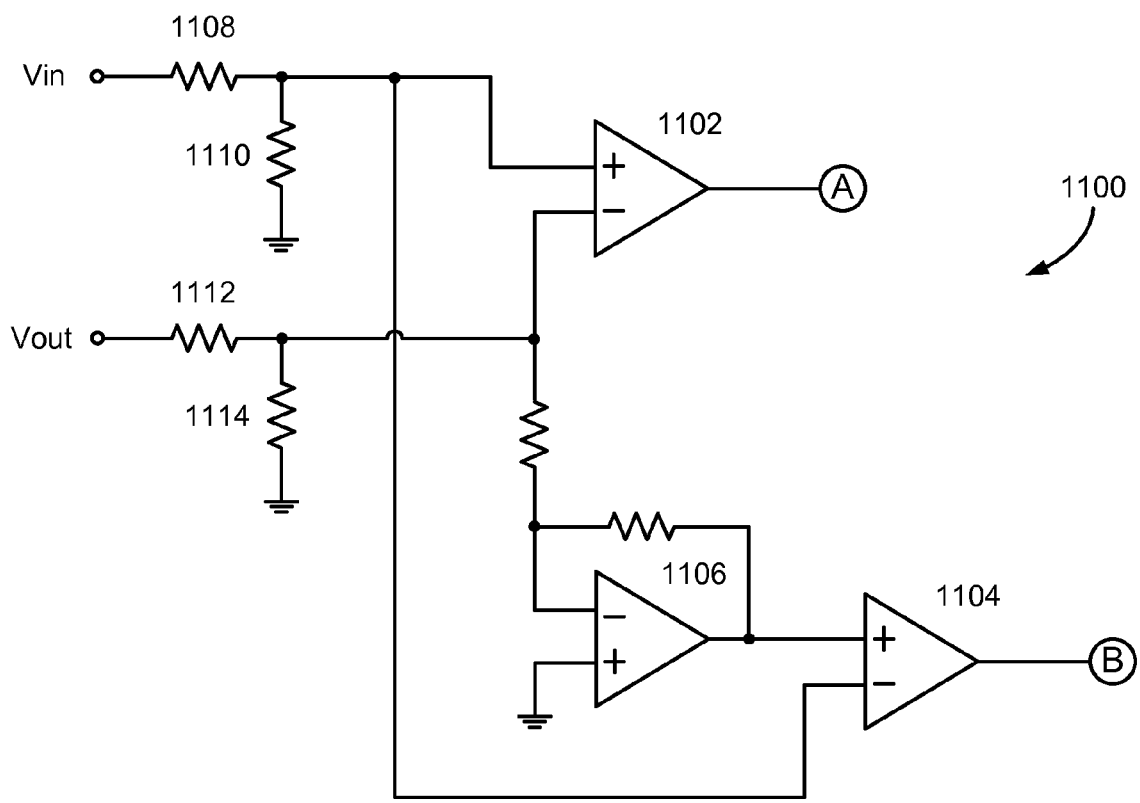
FIG. 11 is a circuit diagram of a comparison circuit that forms part of the controller of the AC/DC converter in FIG. 6 and which compare the AC input voltage Vin to the DC output voltage Vout to determine times whether Vin>Vout and Vin<−Vout.

The controller 614 of the AC/DC converter 600 includes a comparison circuit that continually compares the AC input voltage Vin to the DC output voltage Vout, to determine whether Vin>Vout or Vin<-Vout. FIG. 11 is a drawing of an exemplary comparison circuit 1100 that performs this task. The comparison circuit 1100 comprises first and second comparators 1102 and 1104, an inverting amplifier 1106, a first voltage divider including resistors 1108 and 1110, and a second voltage divider including resistors 1112 and 1114. The first voltage divider scales the AC input voltage down to a scaled AC input voltage αVin so that the voltage is within the acceptable input voltage range limit of the first comparator 1102. The second voltage divider scales the DC output voltage down by the same amount to produce a scaled DC output voltage αVout. The first comparator 1102 compares the scaled AC input voltage αVin to the scaled DC output voltage αVout, producing a high output voltage when Vin>Vout and a low output voltage when Vin<Vout. The inverting amplifier 1106 inverts the scaled DC output voltage αVout to produce a scaled and inverted DC output voltage −αVout. The second comparator 1104 compares the scaled and inverted DC output voltage −αVout to the scaled AC input voltage αVin, producing a high output voltage when Vin<-Vout and a low output voltage when Vin>-Vout.

Figure 12:
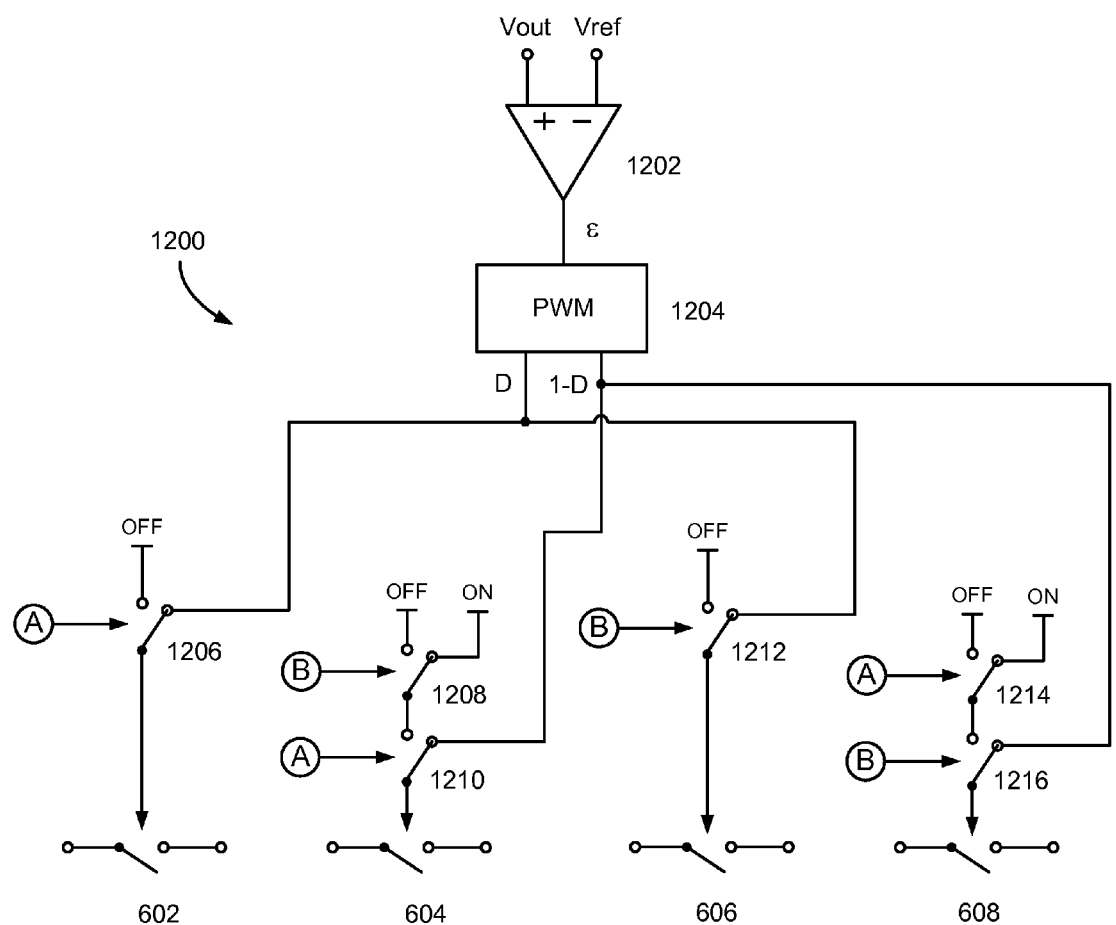
FIG. 12 is a circuit diagram of a switch control circuit that forms part of the controller of the AC/DC converter in FIG. 6 and which operates to control the switching of the switches of the AC/DC converter in FIG. 6.

The controller 614 of the AC/DC converter 600 also includes a switch control circuit 1200, shown in FIG. 12, which controls the switching of the first, second, third, and fourth switches 602, 604, 606 and 608. The switch control circuit 1200 comprises an error amplifier 1202, a pulse-width modulator (PWM) 1204, and switches 1206-1216 having on/off states that control the switching of the first, second, third and fourth switches 602, 604, 606 and 608. The error amplifier 1202 compares the DC output voltage Vout to a precise reference voltage Vref that is equal to and defines the desired DC output voltage Vout and produces an error signals ε based on the difference between Vref and Vout. The PWM 1204 generates the aforementioned switch drive signal (labeled "D" in FIG. 12) and complementary switch drive signal (labeled "1-D" in FIG. 12) and modulates D based on the error signal ε, thereby providing the switch control circuit 1200 the ability to regulate the DC output voltage Vout. The switches 1206-1216 are controlled by the outputs of the first and second comparators 1102 and 1104 of the comparator circuit 1100 in FIG. 11 and control the switching states of the first, second, third and fourth switches 602, 604, 606 and 608, in accordance with the switching table in FIG. 8.

Figures 7, 8:
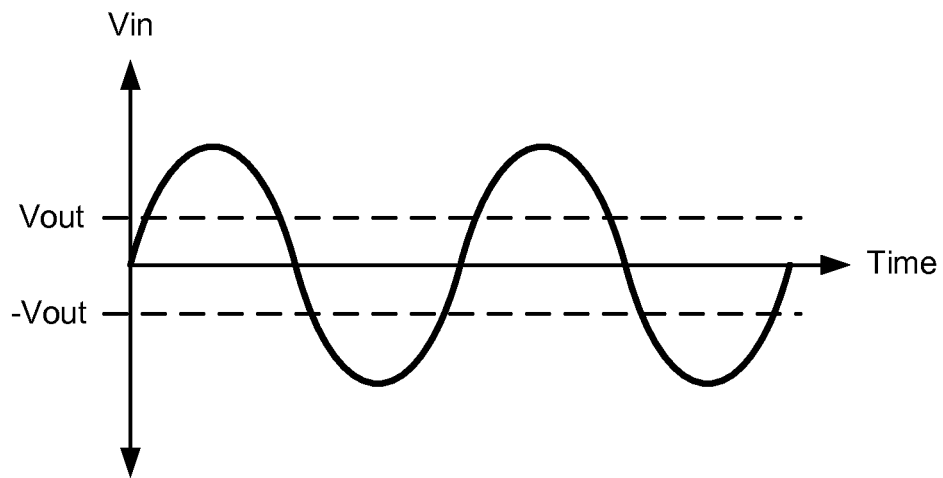
FIG. 7 is a signal diagram of the AC input voltage Vin supplied to the AC/DC converter in FIG. 6 and its relationship to the DC output voltage Vout generated by the AC/DC converter and its inverse −Vout.
FIG. 8 is a table showing how the switches of the AC/DC converter in FIG. 6 are switched and driven, depending on the instantaneous value of the AC input voltage Vin compared to the DC output voltage Vout generated by the AC/DC converter in FIG. 6 and its inverse −Vout.

In the exemplary embodiment above, the switch control circuit 1200 is described as controlling the opening and closing of the switches 606, 604, 606 and 608, according to the switching table in FIG. 8. In another embodiment, the controller 614 is alternatively or further configured to hold switch 608 open during light load conditions. (What defines the light load condition is dependent on the application and established and set during design.) The remaining switches 602, 604 and 606 are configured to operate according to the switching table in FIG. 8, or are configured to not switch at all, with no effect on the load 616. Hence, during light load conditions, the capacitor 612 serves as the power supply for the load 616.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments. Rather, the scope of the invention should be determined by the appended claims, including the full scope of equivalents to which such claims are entitled.

What is claimed is:

1. An AC/DC converter for converting an AC input voltage Vin to a DC output voltage Vout, comprising:
   an inductor;
   first and second switches that, only during positive half cycles of the AC input voltage when Vin>Vout, alternately configure said inductor between storing energy and supplying current;
   third and fourth switches that, only during negative half cycles of the AC input voltage when Vin<−Vout, alternately configure said inductor between storing energy and supplying current; and
   a controller configured to control said first, second, third and fourth switches.

2. The AC/DC converter of claim 1 wherein said controller includes a comparison circuit configured to compare the AC input voltage Vin to the DC output voltage Vout.

3. The AC/DC converter of claim 2 wherein said controller further includes a switch control circuit that controls the switching of said first, second, third and fourth switches depending on comparisons of the AC input voltage Vin to the DC output voltage Vout.

4. The AC/DC converter of claim 1 where said controller includes a switch control circuit that controls the switching of said first, second, third and fourth switches depending on the AC input voltage Vin compared to the DC output voltage Vout.

5. The AC/DC converter of claim 1 wherein only during positive half cycles of the AC input voltage when Vin>Vout said controller is configured to switch said first switch on and off at frequency f and duty cycle D, and is configured to switch said second switch on and off at the frequency f and duty cycle (1-D).

6. The AC/DC converter of claim 5 wherein only during negative half cycles of the AC input voltage when Vin<−Vout said controller is configured to switch said third switch on and off at the frequency f and duty cycle D, and is configured to switch said fourth switch on and off at the frequency f and duty cycle (1-D).

7. The AC/DC converter of claim 6 wherein said controller includes a pulse-width modulator configured to modulate D and regulate the DC output voltage Vout.

8. An AC/DC converter for converting an AC input voltage Vin to a DC output voltage Vout, comprising:
   an inductor;
   a capacitor selectively coupled to said inductor;
   a plurality of switches; and
   a controller that configures the plurality of switches, inductor and capacitor to operate as a buck converter during times when Vin>Vout, and configures the plurality of switches, inductor and capacitor to operate as an inverting buck converter during times when Vin<−Vout,
   wherein said inductor is the only inductor needed by said AC/DC converter to convert said AC input voltage Vin to said DC output voltage Vout.

9. The AC/DC converter of claim 8 wherein said plurality of switches includes first and second switches that serve as buck switches of the buck converter but only during the times when Vin>Vout.

10. The AC/DC converter of claim 9 wherein said plurality of switches further includes third and fourth switches that serve as inverting buck switches of the inverting buck converter but only during the times when Vin<−Vout.

11. The AC/DC converter of claim 8 wherein said plurality of switches includes first, second, third and fourth switches and said controller is configured to:
   switch said first and second switches on and off at a common frequency f and at a duty cycle D and duty cycle (1-D), respectively, but only during the times when Vin>Vout; and
   switch said third and fourth switches on and off at the common frequency f and at the duty cycle D and duty cycle (1-D), respectively, but only during the times when Vin<−Vout.

12. The AC/DC converter of claim 11 wherein said controller includes a pulse-width modulator configured to regulate the DC output voltage by modulating the duty cycle D of the first and third switches and by modulating the duty cycle (1-D) of the second and fourth switches.

13. A method of converting an AC input voltage Vin to a DC output voltage Vout, comprising:
   converting the AC input voltage during positive half cycles to the DC output voltage Vout using a buck converter; and
   converting the AC input voltage during negative half cycles to the DC output voltage Vout using an inverting buck converter,
   wherein said buck converter and said inverting buck converter share an inductor and said shared inductor is the only inductor needed by said buck converter and said inverting buck converter to convert said AC input voltage Vin to said DC output voltage Vout.

14. The method of claim 13 wherein converting the AC input voltage to the DC output voltage during the positive and negative half cycles are performed by modulating duty cycles of switches of said buck converter and said inverting buck converter.

15. The method of claim 13 wherein converting positive half cycles of the AC input voltage to the DC output voltage Vout using the buck converter comprises:
   determining times when Vin>Vout; and
   for times it is determined that Vin>Vout, converting the AC input voltage to the DC output voltage Vout.

16. The method of claim 13 wherein converting negative half cycles of the AC input voltage to the DC output voltage Vout using an inverting buck converter comprises:
   determining times when Vin<−Vout; and
   for times it is determined that Vin<−Vout, converting the AC input voltage to the DC output voltage Vout.

17. The method of claim 13 wherein the buck converter and inverting buck converter comprise a conjoined buck and inverting buck converter circuit that shares said inductor.

18. An AC/DC converter for converting an AC input voltage Vin to a DC output voltage Vout, comprising:
- means for determining times when Vin>Vout and times when Vin<−Vout;
- first converting means for converting the AC input voltage during positive half cycles to the DC output voltage Vout during times when Vin>Vout; and
- second converting means for converting the AC input voltage during negative half cycles to the DC output voltage Vout during times when Vin<−Vout.

19. The AC/DC converter of claim 18, further comprising means for controlling said first converting means and said second converting means.

20. The AC/DC converter of claim 19 wherein:
- said first converting means includes first switching means;
- said second converting means includes second switching means; and
- said means for controlling is configured to control said first and second switching means to maintain the DC output voltage Vout at a constant level.

21. An AC/DC converter for converting an AC input voltage Vin to a DC output voltage Vout, comprising:
- an inductor;
- a first plurality of switches configured to alternately couple and decouple said inductor to and from an AC input voltage during positive half cycles of the AC input voltage; and
- a second plurality of switches configured to alternately couple and decouple said inductor to and from the AC input voltage during negative half cycles of the AC input voltage,
- wherein said inductor and said second plurality of switches are configured as an inverting buck converter during times when Vin<−Vout.

22. An AC/DC converter for converting an AC input voltage Vin to a DC output voltage Vout, comprising:
- an inductor;
- a first plurality of switches configured to alternately couple and decouple said inductor to and from an AC input voltage during positive half cycles of the AC input voltage; and
- a second plurality of switches configured to alternately couple and decouple said inductor to and from the AC input voltage during negative half cycles of the AC input voltage,
- wherein all switches of said first and second pluralities of switches are configured to remain off during times when |Vin|<Vout.

23. The AC/DC converter of claim 1 wherein said inductor is the only inductor needed to convert said AC input voltage Vin to said DC output voltage Vout.

24. An AC/DC converter for converting an AC input voltage Vin to a DC output voltage Vout, comprising:
- an inductor;
- a first plurality of switches configured to alternately couple and decouple said inductor to and from an AC input voltage during positive half cycles of the AC input voltage; and
- a second plurality of switches configured to alternately couple and decouple said inductor to and from the AC input voltage during negative half cycles of the AC input voltage,
- wherein said inductor is the only inductor needed to convert said AC input voltage Vin to said DC output voltage Vout.

* * * * *